Feb. 13, 1923. 1,445,187.
E. B. VAUGHAN.
PROCESS OF PRODUCING A FROZEN CONFECTION.
FILED JUNE 26, 1922.

Inventor
E. B. VAUGHAN.
By Rodney Phelps
Attorneys

Patented Feb. 13, 1923.

1,445,187

UNITED STATES PATENT OFFICE.

EARNEY B. VAUGHAN, OF LONG BEACH, CALIFORNIA.

PROCESS OF PRODUCING A FROZEN CONFECTION.

Application filed June 26, 1922. Serial No. 570,987.

*To all whom it may concern:*

Be it known that I, EARNEY B. VAUGHAN, a citizen of the United States, residing at Long Beach, in the county of Los Angeles and State of California, have invented certain new and useful Improvements in Processes of Producing a Frozen Confection, of which the following is a specification.

The invention relates to confections, and has as an object the provision of a process of producing a confection having a frozen center surrounded by an integral shell of baked material completely enclosing the center. A further object of the invention is the provision of a process of producing a confection which can be stored without deterioration in cold storage, and can be handled without soiling the fingers of the consumer.

An illustrative embodiment of the article produced by the invention and of the process of producing the same is shown in the accompanying drawings, in which—

The invention provides a confection formed of a center of frozen material, such as ice cream or an ice, preferably of egg shape, surrounded by a shell of material baked in place, which material may be cone batter, cone batter rolled in cocoanut, marsh mallow, or other suitable material.

According to one modification of the process for producing the material, two half shells 10—11 are supplied with sufficient batter, 13, to produce a thin casing upon the frozen center. The center material 14 in a hard frozen condition is then laid within one of the lined shells and the other shell is inverted upon it whereupon the edges of the batter contained in the two shells flow together.

Figure 1:
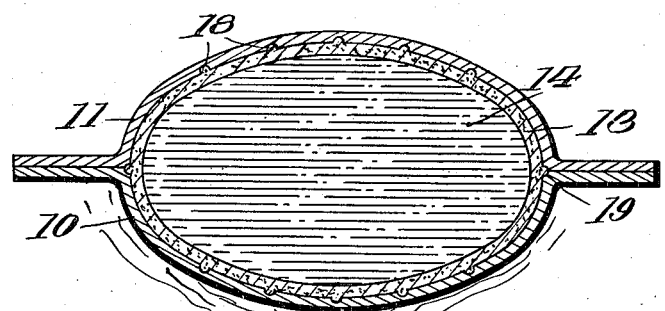
Fig. 1 is a central vertical section through the confection enclosed in a shell within which it may be baked.
Figure 2:
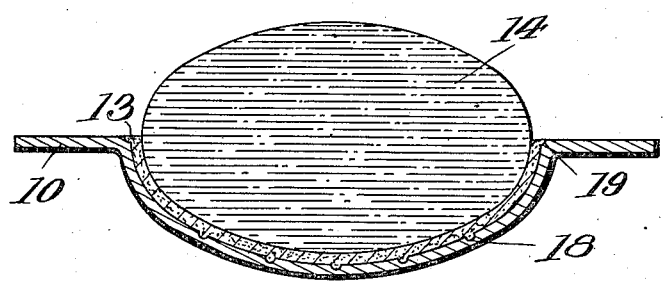
Fig. 2 is a section of one of the two like halves of the shell showing the batter and the frozen material which is to be enclosed in the completed product in place.
Figure 3:
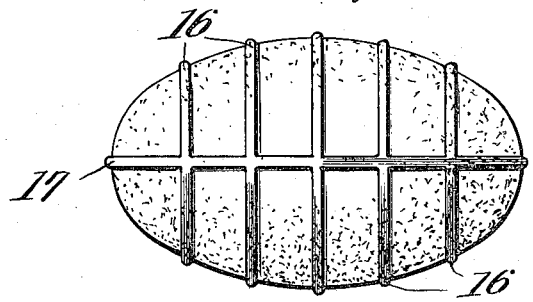
Fig. 3 is a side view of the completed product.

The shells containing the unbaked batter and the frozen center and then subjected to the action of a source of dry heat shown in Fig 1, as a gas burner 15, which heat should be of such a temperature as to very quickly bake the batter. The center being hard frozen it is found possible to bake the batter sufficiently before the center begins to melt in any serious degree.

After the batter is baked the shells are quickly opened, the completed product is removed therefrom, wrapped in whatever covering is desired and returned to cold storage wherein the center is again frozen hard.

When the cone batter is used as a covering the heat insulating properties thereof are excellent, and the same may be handled without danger of soiling the fingers, as is the case with confections covered with chocolate.

If desired and if the cleanliness referred to is not essential the completed product as above described may be coated with chocolate.

A variation of the process comprises rolling the hard frozen centers in the batter and then rolling them upon a hot plate so as to quickly bake the batter in situ. When practiced in this manner the batter covered center may be rolled in shredded cocoanut previous to baking, if desired. Marshmallow or other suitable material may be substituted for the cone batter as a material to be baked thereon by means of the shells 10—11, if desired, or any other material which can be quickly baked, as contemplated by the invention and which will produce a heat insultating protecting coating of sufficient firmness in the completed article.

If desired ornamental ridges 16—17 may be produced upon the exterior of the completed product by means of suitable grooves 18—19 in the surface of the shell within which the covering 13 is baked. The production of a ridge such as indicated at 17 will be an additional assistance to a complete closing of the joint between the linings of the unbaked batter in the two halves of the shell and will lessen the objection to the appearance of a ragged joining line which it would be difficult to avoid if it were attempted to make the covering completely smooth.

Minor changes may be made in the physical embodiment of the invention or in the carrying out of the steps of the process without departing from the spirit of the invention.

I claim:

1. The process of producing a confection which comprises producing a mass of hard frozen confection, completely enclosing said mass in a covering of unbaked material, submitting said thus covered mass to the action of metal in intimate contact therewith and heated to baking temperature whereby to bake the covering without deleterious effect upon the mass.

2. The process of producing a frozen confection which comprises lining the two halves of a form with batter, placing a mass of frozen confection in one of said forms and covering the same with the other form thereby joining the edges of the batter in the two hollows of the form, submitting the closed shells to quick heat whereby to bake the batter without deleterious effect upon the center.

3. The process of producing a frozen confection which comprises lining the two halves of a form with batter, placing a mass of frozen confection in one of said forms and covering the same with the other form thereby joining the edges of the linings, submitting the closed shells to quick heat whereby to bake the batter without deleterious effect upon the center, and refreezing the completed product.

EARNEY B. VAUGHAN.